US011907502B1

United States Patent
Rai

(10) Patent No.: US 11,907,502 B1
(45) Date of Patent: Feb. 20, 2024

(54) AUTOMATIC CONTACT SHARING AND CONNECTION SYSTEM AND METHOD

(71) Applicant: Woofy, Inc., New York, NY (US)

(72) Inventor: Arjun Rai, New York, NY (US)

(73) Assignee: Woofy, Inc., New York, NY (US)

( * ) Notice: Subject to any disclaimer, the term of this patent is extended or adjusted under 35 U.S.C. 154(b) by 0 days.

(21) Appl. No.: 18/112,770

(22) Filed: Feb. 22, 2023

(51) Int. Cl.
*G06F 3/048* (2013.01)
*G06F 3/0482* (2013.01)
*G06F 3/0488* (2022.01)

(52) U.S. Cl.
CPC .......... *G06F 3/0482* (2013.01); *G06F 3/0488* (2013.01)

(58) Field of Classification Search
CPC .............................. G06F 3/0482; G06F 3/0488
See application file for complete search history.

(56) References Cited

U.S. PATENT DOCUMENTS

| | | | | |
|---|---|---|---|---|
| 7,925,620 B1* | 4/2011 | Yoon | ................... | G06Q 10/109 707/705 |
| 9,760,645 B1* | 9/2017 | Park | ................. | G06K 19/06037 |
| 2015/0112990 A1* | 4/2015 | van Os | ................. | G06F 16/435 707/737 |
| 2016/0180322 A1* | 6/2016 | Song | .................... | H04L 63/083 705/44 |
| 2016/0352816 A1* | 12/2016 | Xiao | ................. | H04M 1/72403 |
| 2017/0026316 A1* | 1/2017 | Li | ........................... | H04L 51/04 |
| 2019/0361580 A1* | 11/2019 | Dowling | ............... | G06F 3/0484 |
| 2019/0362002 A1* | 11/2019 | Dowling | ................ | G06F 40/18 |
| 2020/0226695 A1* | 7/2020 | Lee | ......................... | G06Q 50/01 |
| 2021/0209552 A1* | 7/2021 | Kang | ................. | G06F 21/6245 |
| 2021/0256476 A1* | 8/2021 | Mpare | .................. | H04W 4/029 |
| 2022/0404964 A1* | 12/2022 | Chen | ................... | G06F 3/04883 |

OTHER PUBLICATIONS

Authors et. al., System and Methods for automated, controlled situational personal information distribution, 2003, IPCOM Pad, 7 pages.*
Liew et al., ARCards: Marker-Based Augmented Reality Recognition for Business Cards, 2022, IEEE, 8 pages.*
Limpasuthum et al., Lightweight Automatic Business Card Generator , Utilizing the Swift Language, 2022, a pages/.*
Majid1 et al., A Novel approach to exchange information in real time: Contact Smart Card, 2017, IEEE, 4 pages.*

* cited by examiner

*Primary Examiner* — Linh K Pham
(74) *Attorney, Agent, or Firm* — Fresh IP PLC; John R. Bednarz

(57) ABSTRACT

A system includes least one processor to display a graphical user interface (GUI) comprising at least one user interface element that when selected captures at least one image by an imaging device, display a carousel GUI that shows a first contact card from a list of contact cards, the first contact card comprising a name of a first contact, the phone number of the first contact, and the email address of the first contact displayed as a first layer that displays on top of a second layer comprising the at least one image and simultaneously display a first map GUI that shows a map of where the at least one image of the imaging device is captured.

22 Claims, 15 Drawing Sheets

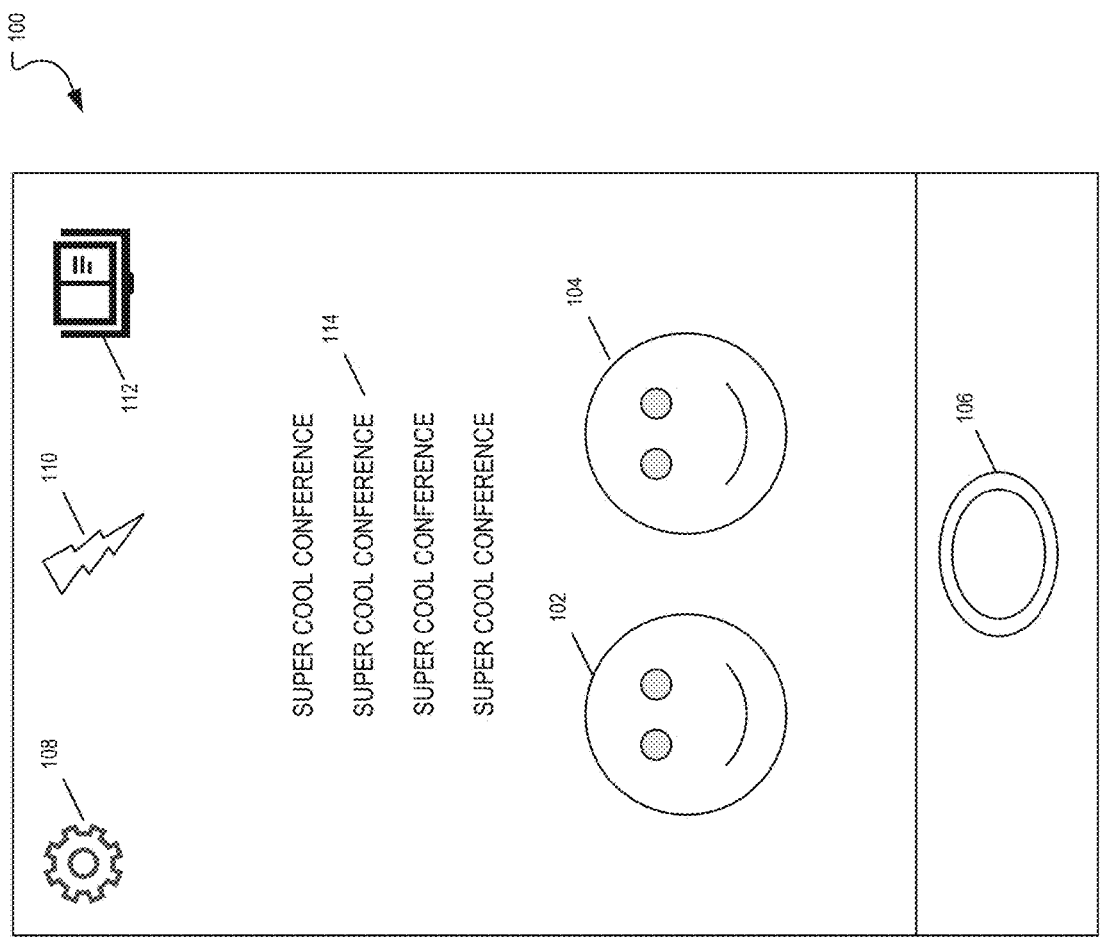

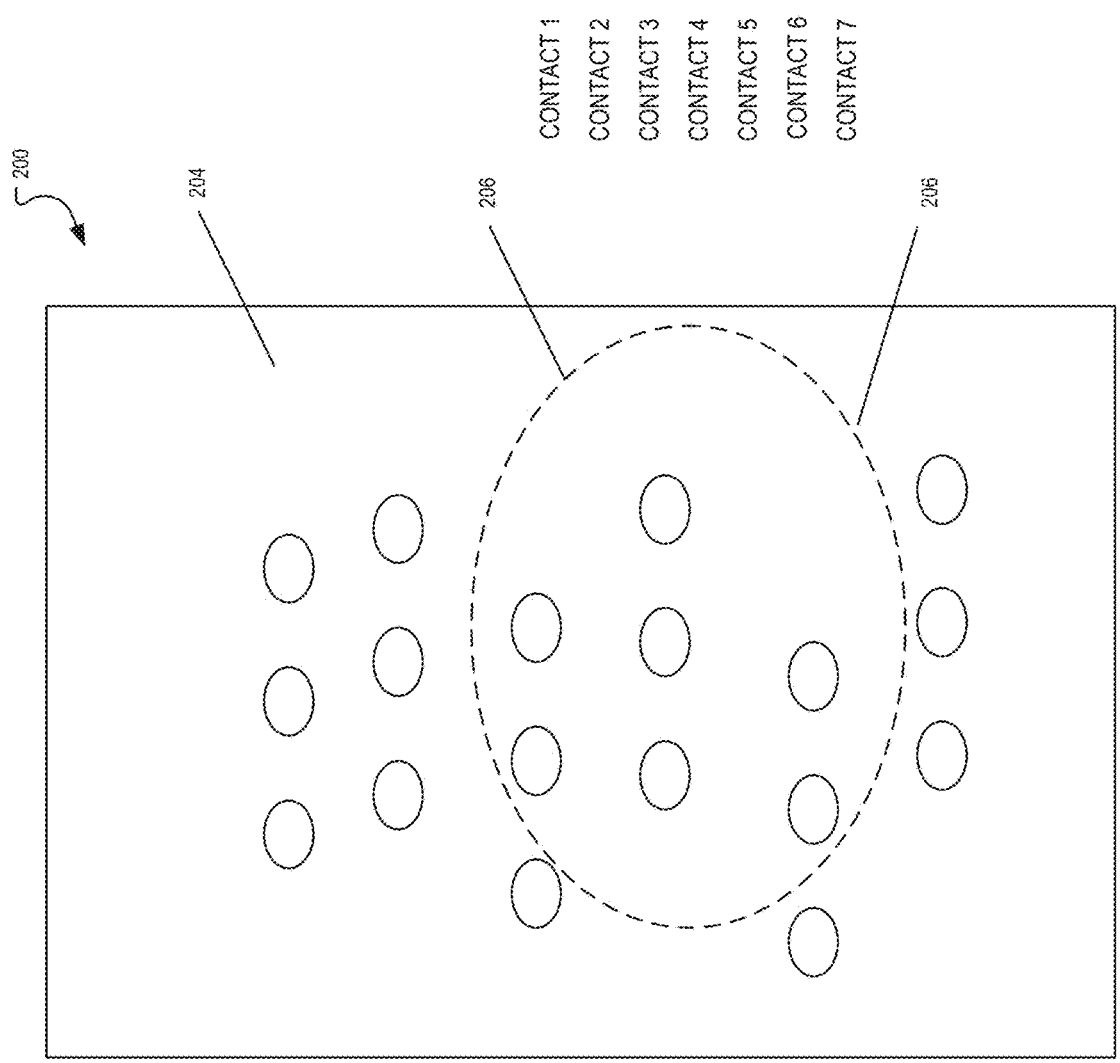

AUTOMATIC CONTACT SHARING AND CONNECTION SYSTEM AND METHOD

BACKGROUND

There are many situations where people meet others for a first time such as at a breakfast, lunch, dinner, conference, event, or meeting. In some of these situations, one may be meeting many different people rapidly and may even be meeting more than one person at a time. Conventionally, it was common to share a business card with others when first meeting and, in many cases, one could leave an event with dozens of business cards. It can be very time-consuming and tedious to attempt to communicate with new people.

After an event, one would have to go through the business cards and attempt to associate names and faces with contact information. Sometimes people did not have business cards to share. As a result, one may meet a number of people and end up not being able to follow up. In addition, one may not remember where and when one first met a person.

It is with these issues in mind, among others, that various aspects of the disclosure were conceived.

SUMMARY

According to one aspect, an automatic contact sharing and connection application may include at least one client computing device having an automatic contact sharing and connection application and a server computing device having the automatic contact sharing and connection application.

A user of one of the client computing devices may use the automatic contact sharing and connection application to capture one or more images using one or more front-facing imaging devices of the client computing device and/or rear-facing imaging devices of the client computing device. As an example, the one or more images may be a selfie of two people. However, the one or more images may be a selfie of one person or more than two people. A first person may be a user of the automatic contact sharing and connection application and may take the one or more images with a second person. As an example, the first person may have met the second person at a lunch, dinner, meeting, conference, or another type of event.

The first person may obtain a name of the second person, a phone number of the second person, and an email address of the second person and input this information into a graphical user interface (GUI) that may be displayed on top of the one or more images. In addition, the automatic contact sharing and connection application may obtain a location where the one or more images are captured, e.g., GPS coordinates in a particular location. In one example, the location may be determined using at least one of GPS hardware information, Wi-Fi network information, cellular network information including cellular tower locations, and Bluetooth hardware information. The user of the automatic contact sharing and connection application may continue to meet other people and take one or more images and obtain name information, phone number information, and email address information. After the event, the user can review a carousel of information including a card associated with each person and can get in contact with each person. As an example, the user can send an email to the email address of the person, send a text message to the person, or call the person, among others.

According to an aspect, a system includes a memory and at least one processor to execute computer-executable instructions to display a graphical user interface (GUI) comprising at least one user interface element that when selected captures at least one image by an imaging device, display an input user interface element as a first layer that displays on top of a second layer comprising the at least one image, receive input from the input user interface element comprising a name of a first contact, a phone number of the first contact, and an email address of the first contact, obtain location information associated with where the at least one image of the imaging device is captured, display a carousel GUI that shows a first contact card from a list of contact cards, the first contact card comprising the name of the first contact, the phone number of the first contact, and the email address of the first contact displayed as the first layer that displays on top of the second layer comprising the at least one image and simultaneously display a first map GUI that shows a map of where the at least one image of the imaging device is captured, and receive a request to display a second contact card from the list of contact cards and transition the carousel GUI from the first contact card to display a second contact card comprising a name of a second contact, a phone number of the second contact, and an email address of the second contact displayed as the first layer that displays on top of the second layer comprising at least one image of the second contact and simultaneously display a second map GUI that shows a map of where the at least one image of the second contact is captured.

According to another aspect, a method includes displaying, by at least one processor, a graphical user interface (GUI) comprising at least one user interface element that when selected captures at least one image by an imaging device, displaying, by the at least one processor, an input user interface element as a first layer that displays on top of a second layer comprising the at least one image, receiving, by the at least one processor, input from the input user interface element comprising a name of a first contact, a phone number of the first contact, and an email address of the first contact, obtaining, by the at least one processor, location information associated with where the at least one image of the imaging device is captured, displaying, by the at least one processor, a carousel GUI that shows a first contact card from a list of contact cards, the first contact card comprising the name of the first contact, the phone number of the first contact, and the email address of the first contact displayed as the first layer that displays on top of the second layer comprising the at least one image and simultaneously displaying a first map GUI that shows a map of where the at least one image of the imaging device is captured, and receiving, by the at least one processor, a request to display a second contact card from the list of contact cards and transitioning the carousel GUI from the first contact card to displaying a second contact card comprising a name of a second contact, a phone number of the second contact, and an email address of the second contact displayed as the first layer that displays on top of the second layer comprising at least one image of the second contact and simultaneously display a second map GUI that shows a map of where the at least one image of the second contact is captured.

According to an additional aspect, a non-transitory computer-readable storage medium includes instructions stored thereon that, when executed by a computing device cause the computing device to perform operations, the operations including displaying a graphical user interface (GUI) comprising at least one user interface element that when selected captures at least one image by an imaging device, displaying an input user interface element as a first layer that displays on top of a second layer comprising the at least one image, receiving input from the input user interface element comprising a name of a first contact, a phone number of the first contact, and an email address of the first contact, obtaining location information associated with where the at least one image of the imaging device is captured, displaying a carousel GUI that shows a first contact card from a list of contact cards, the first contact card comprising the name of the first contact, the phone number of the first contact, and the email address of the first contact displayed as the first layer that displays on top of the second layer comprising the at least one image and simultaneously displaying a first map GUI that shows a map of where the at least one image of the imaging device is captured, and receiving a request to display a second contact card from the list of contact cards and transitioning the carousel GUI from the first contact card to displaying a second contact card comprising a name of a second contact, a phone number of the second contact, and an email address of the second contact displayed as the first layer that displays on top of the second layer comprising at least one image of the second contact and simultaneously display a second map GUI that shows a map of where the at least one image of the second contact is captured.

These and other aspects, features, and benefits of the present disclosure will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate embodiments and/or aspects of the disclosure and, together with the written description, serve to explain the principles of the disclosure. Wherever possible, the same reference numbers are used throughout the drawings to refer to the same or like elements of an embodiment, and wherein:

FIG. 1 shows a block diagram of an example user interface associated with an automatic contact sharing and connection system and application according to an example of the instant disclosure.

FIG. 2B shows another block diagram of an example of the user interface associated with the automatic contact sharing and connection system and application according to an example of the instant disclosure.

DETAILED DESCRIPTION

Figure 2A:
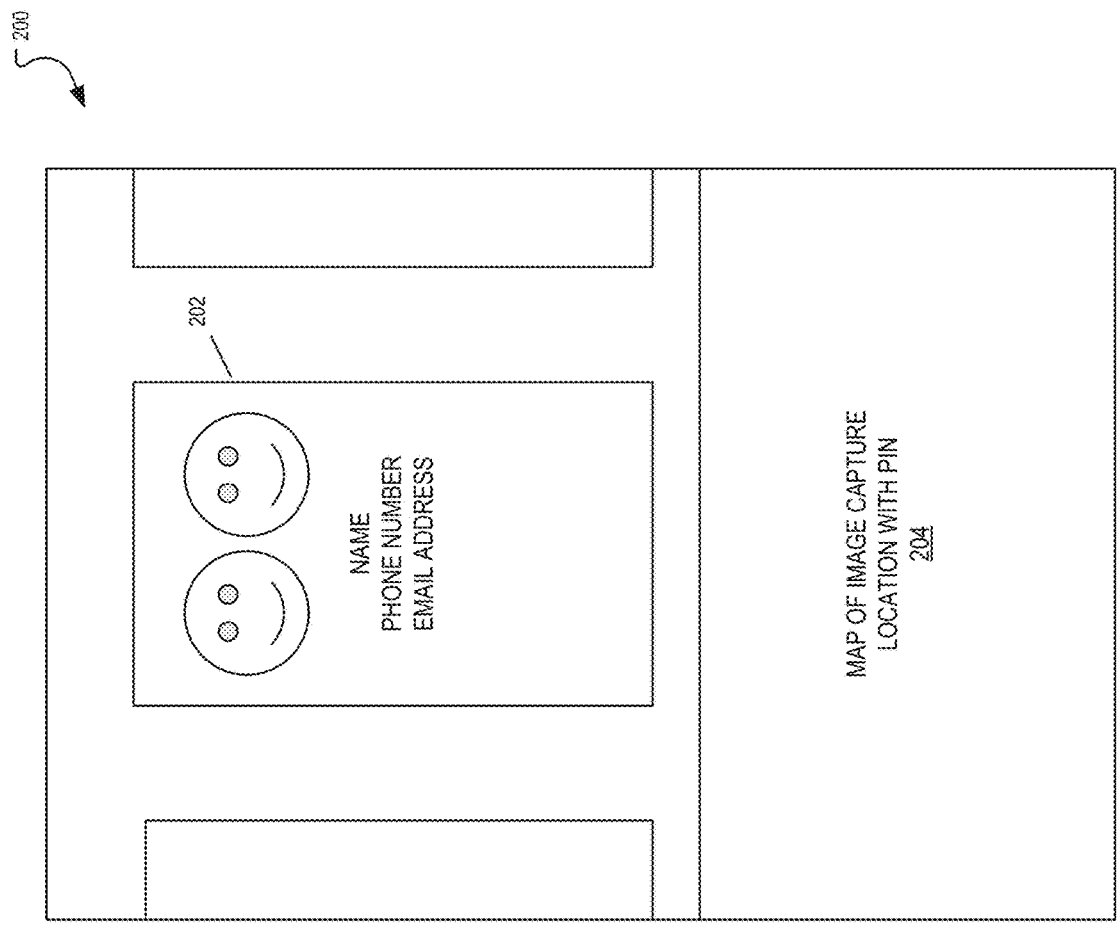
FIG. 2A shows another block diagram of an example of the user interface associated with the automatic contact sharing and connection system and application according to an example of the instant disclosure.

The present invention is more fully described below with reference to the accompanying figures. The following description is exemplary in that several embodiments are described (e.g., by use of the terms "preferably," "for example," or "in one embodiment"); however, such should not be viewed as limiting or as setting forth the only embodiments of the present invention, as the invention encompasses other embodiments not specifically recited in this description, including alternatives, modifications, and equivalents within the spirit and scope of the invention. Further, the use of the terms "invention," "present invention," "embodiment," and similar terms throughout the description are used broadly and not intended to mean that the invention requires, or is limited to, any particular aspect being described or that such description is the only manner in which the invention may be made or used. Additionally, the invention may be described in the context of specific applications; however, the invention may be used in a variety of applications not specifically described.

The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. When a particular feature, structure, or characteristic is described in connection with an embodiment, persons skilled in the art may effect such feature, structure, or characteristic in connection with other embodiments whether or not explicitly described.

In the several figures, like reference numerals may be used for like elements having like functions even in different drawings. The embodiments described, and their detailed construction and elements, are merely provided to assist in a comprehensive understanding of the invention. Thus, it is apparent that the present invention can be carried out in a variety of ways, and does not require any of the specific features described herein. Also, well-known functions or constructions are not described in detail since they would obscure the invention with unnecessary detail. Any signal arrows in the drawings/figures should be considered only as exemplary, and not limiting, unless otherwise specifically noted. Further, the description is not to be taken in a limiting sense, but is made merely for the purpose of illustrating the general principles of the invention, since the scope of the invention is best defined by the appended claims.

It will be understood that, although the terms "first," "second," etc. may be used herein to describe various elements, these elements should not be limited by these terms. These terms are only used to distinguish one element from another. Purely as a non-limiting example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an," and "the" are intended to include the plural forms as well, unless the context clearly indicates otherwise. It should also be noted that, in some alternative implementations, the functions and/or acts noted may occur out of the order as represented in at least one of the several figures. Purely as a non-limiting example, two figures shown in succession may in fact be executed substantially concurrently or may sometimes be executed in the reverse order, depending upon the functionality and/or acts described or depicted.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Aspects of a system and method for automatic contact sharing and connection may include one or more client computing devices having an automatic contact sharing and connection application and one or more server computing devices having an automatic contact sharing and connection application. A user of one of the client computing devices may use the automatic contact sharing and connection application to capture one or more images using one or more front-facing imaging devices of the client computing device and/or rear-facing imaging devices of the client computing device. As an example, the one or more images may be a selfie of two people. A first person may be a user of the automatic contact sharing and connection application and may take the one or more images of a second person. The first person or user may input their contact information when first using the automatic contact sharing and connection application including one or more images or videos, name information, a phone number, an email address, and other information such as biography information that may include one or more uniform resource locators (URLs) such as a personal website or a LINKEDIN profile. As an example, the first person may have met the second person at a lunch, dinner, meeting, conference, or another type of event.

The first person may obtain a name of the second person, a phone number of the second person, and an email address of the second person and input this information into a graphical user interface (GUI) that may be displayed on top of the one or more images. The name, phone number, email address, and other information may be imported or input automatically using a QR code or using NFC, or Bluetooth. In addition, the automatic contact sharing and connection application may obtain a location where the one or more images are captured, e.g., GPS coordinates in New York, NY such as 40.7826° N, 73.9656° W. In one example, the location may be determined using at least one of GPS hardware information, Wi-Fi network information, cellular network information including cellular tower locations, and Bluetooth hardware information. The user of the automatic contact sharing and connection application may continue to meet other people and take one or more images and obtain name information, phone number information, and email address information. After the event, the user can review a carousel of information including a card associated with each person and can get in contact with each person. As an example, the user can send an email to the email address of the person, send a text message to the person, or call the person. The user can select a user interface element to generate and send an email based on a template, generate and send a text message based on a template, or call the person using the contact information that was obtained.

In one example, the system includes a memory and at least one processor to execute computer-executable instructions to display a graphical user interface (GUI) comprising at least one user interface element that when selected captures at least one image by an imaging device, display an input user interface element as a first layer that displays on top of a second layer comprising the at least one image, receive input from the input user interface element comprising a name of a first contact, a phone number of the first contact, and an email address of the first contact, obtain location information associated with where the at least one image of the imaging device is captured, display a carousel GUI that shows a first contact card from a list of contact cards, the first contact card comprising the name of the first contact, the phone number of the first contact, and the email address of the first contact displayed as the first layer that displays on top of the second layer comprising the at least one image and simultaneously display a first map GUI that shows a map of where the at least one image of the imaging device is captured, and receive a request to display a second contact card from the list of contact cards and transition the carousel GUI from the first contact card to display a second contact card comprising a name of a second contact, a phone number of the second contact, and an email address of the second contact displayed as the first layer that displays on top of the second layer comprising at least one image of the second contact and simultaneously display a second map GUI that shows a map of where the at least one image of the second contact is captured.

FIG. 1 shows a block diagram of an example of user interface 100 associated with an automatic contact sharing and connection system and application according to an example of the instant disclosure. As shown in FIG. 1, a client computing device may display the user interface 100 that shows a first face 102 and a second face 104. Alternatively, the image may be only a single person or more than one person and thus there may be less than two faces or more than two faces.

The first face 102 and the second face 104 may be associated with a first person and a second person that have just met at a particular event such as a breakfast, lunch, dinner, conference, meeting, or another type of event. Instead of sharing contact information verbally, sharing business cards, or swapping pieces of paper, the first person and the second person can use the example user interface 100 to capture an image using a capture button or user interface element 106. The button may be used to capture at least one of one or more photographs and video. The example user interface 100 also shows a settings button or user interface element 108, a flash button or user interface element 110, and a contacts button or user interface element 112. Additionally, the user interface can optionally display filter information that can be displayed and captured with the image that may include a name of a conference or logo information associated with the meeting or conference 114.

When selecting the settings button 108, the user may provide personal information such as a photo or selfie of the user, name information, a phone number, an email address, and other information such as text information associated with the user that may include one or more uniform resource locators (URLs) and/or biographical information. Additionally, the user may sign into the system by providing username and password information. The user may sign into the system to store information in a database that may be associated with a server computing device.

A user can select the flash button or user interface element 110 to toggle one or more flashes of the front-facing imaging devices and/or rear-facing imaging devices of a client computing device.

A user can select the contacts button or user interface element 112 to view a list of contacts, each contact in the list of contacts having an associated contact card having contact information that may include name information, phone number information, email address information, notes information, and one or more images or videos associated with the contact.

FIG. 2A shows another representation of the example of the user interface 200 associated with the automatic contact sharing and connection system and application according to an example of the instant disclosure. After the first person and the second person capture the image as shown in FIG. 1, the user interface 200 may be displayed that may allow the first person and/or the second person to enter information. The first person or the second person can input a name of the second person, a phone number of the second person, and an email address of the second person. The name, phone number, and the email address may be displayed as a first layer over the image 202 that may be displayed as a second layer. The first person or the second person can also enter any additional information such as notes as well as uniform resource locators (URLs). The additional information may include ASCII text that includes emoticons or emojis. Additionally, the user interface 200 may display map information such as a map that is associated with an image capture location with a pin 204. The map information may be displayed on a bottom of the user interface and the image 202 on the top of the user interface may be a carousel. As an example, the carousel may be associated with a list or an array of contacts that may transition or rotate through three contacts as follows: 0, 1, 2, and back to 0. As an example, a user can swipe through the carousel to rotate or transition through them by swiping or rotating the carousel horizontally from left to right or right to left, among other directions. The first person may page or scroll through the carousel of images and when scrolling through the images, a different image with name, phone number, and email address information may be displayed. Additionally, a corresponding map of an image capture location with pin 204 may be displayed for each image 202.

Each pin may be selected and when a pin is selected, a user interface element may be displayed above or associated with the pin that provides a name of a contact, the selfie or image of the contact, an email button or user interface element to draft and send an email to the contact, a text message button or user interface element to draft and send a text message to the contact, and a call button or user interface element to draft and send a text message to the contact.

As another example, each user of the automatic contact sharing and connection application may have a unique two-dimensional code such as a QR code that represents the user. Another user can use an imaging device of a client computing device to capture the two-dimensional code and provide contact information to the user.

FIG. 2B shows another representation of the example of the user interface 200 associated with the automatic contact sharing and connection system and application according to an example of the instant disclosure. As shown in FIG. 2B, the automatic contact sharing and connection application may allow a user to select a particular location 206 on the map 204 or select a particular period of time and filter contact information based on the filter. In other words, the contacts may be filtered based on location. In one example, the user can draw a circle or another shape 206 on the map 204 by selecting a particular area on the touchscreen of the client computing device. This may select only contacts that were met in the circle or shape 206.

Figure 3A:
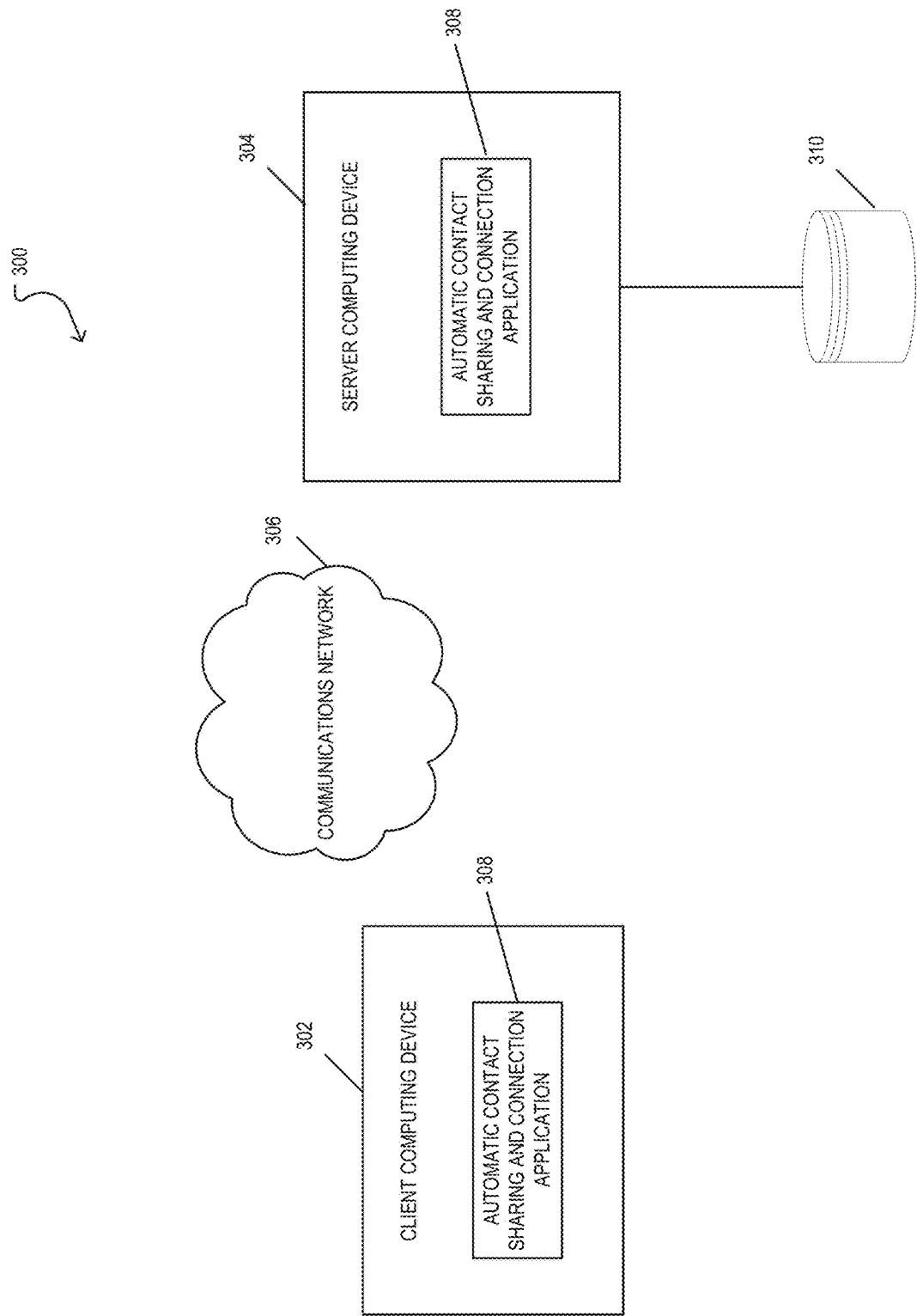
FIG. 3A shows a block diagram of an automatic contact sharing and connection system according to an example of the instant disclosure.

FIG. 3A shows a block diagram of a computing system comprising an automatic contact sharing and connection system 300 according to an example of the instant disclosure. The automatic contact sharing and connection system 300 includes at least one client computing device 302 that is in communication with at least one server computing device 304 via a communication network 306. The at least one client computing device 302 may have an application or at least one component of an application, e.g., an automatic contact sharing and connection application 308. In addition, the at least one server computing device 304 may have an application or at least one component of an application, e.g., an automatic contact sharing and connection application 308.

The at least one client computing device 302 is configured to receive data from and/or transmit data to the at least one server computing device 304 through the communication network 306. Although the at least one client computing device 302 is shown as a single computing device, it is contemplated that the at least one client computing device 302 may include multiple computing devices.

The communication network 306 can be the Internet, an intranet, or another wired or wireless communication network. For example, the communication network 306 may include a Mobile Communications (GSM) network, a code division multiple access (CDMA) network, $3^{rd}$ Generation Partnership Project (GPP) network, an Internet Protocol (IP) network, a wireless application protocol (WAP) network, a WiFi network, a Bluetooth network, a satellite communications network, or an IEEE 802.11 standards network, as well as various communications thereof. Other conventional and/or later developed wired and wireless networks may also be used.

The at least one client computing device 302 includes at least one processor to process data and memory to store data. The processor processes communications, builds communications, retrieves data from memory, and stores data to memory. The processor and the memory are hardware. The memory may include volatile and/or non-volatile memory, e.g., a computer-readable storage medium such as a cache, random access memory (RAM), read only memory (ROM), flash memory, or other memory to store data and/or computer-readable executable instructions such as a portion or component of the automatic contact sharing and connection application 308. In addition, the at least one client computing device 302 further includes at least one communications interface to transmit and receive communications, messages, and/or signals.

The at least one server computing device 304 includes at least one processor to process data and memory to store data. The processor processes communications, builds communications, retrieves data from memory, and stores data to memory. The processor and the memory are hardware. The memory may include volatile and/or non-volatile memory, e.g., a computer-readable storage medium such as a cache, random access memory (RAM), read only memory (ROM), flash memory, or other memory to store data and/or computer-readable executable instructions such as a portion or a component of the automatic contact sharing and connection application 308. In addition, the at least one server computing device 304 further includes at least one communications interface to transmit and receive communications, messages, and/or signals.

The at least one client computing device 302 can be a laptop computer, a smartphone, a personal digital assistant, a tablet computer, a standard personal computer, or another processing device. The at least one client computing device 302 may include a display, such as a computer monitor, for displaying data and/or graphical user interfaces. The at least one client computing device 302 may also include an input device, such as one or more cameras, a keyboard or a pointing device (e.g., a mouse, trackball, pen, or touch screen) to enter data into or interact with graphical and/or other types of user interfaces. In an example, the display and the input device may be incorporated together as a touch screen of the smartphone or tablet computer. Additionally, the at least one client computing device 302 may include a Global Positioning System (GPS) hardware device for determining a particular location of the client computing device 302, one or more accelerometers, and one or more magnetometers, one or more LiDAR sensors, Bluetooth hardware devices, and near-field communication (NFC) hardware devices, among others.

The at least one client computing device 302 may display on the display a graphical user interface (or GUI). The graphical user interface may be provided by the automatic contact sharing and connection application 308. The graphical user interface enables a user of the at least one client computing device 302 to interact with the automatic contact sharing and connection application 308 and capture an image, e.g., a selfie, at a particular event as well as input contact information for a particular person. A user is able to capture an image using the client computing device 302 and input a name, phone number, and an email address that may be associated with the image for the particular person as well as additional information such as notes that may include uniform resource locators (URLs). In addition, the automatic contact sharing and connection application 308 may determine a particular location where the image was captured and may display a map that shows where the image was captured. In one example, the location may be determined using at least one of GPS hardware information, Wi-Fi network information, cellular network information including cellular tower locations, and Bluetooth hardware information.

The automatic contact sharing and connection application 308 may be a component of an application and/or service executable by the at least one client computing device 302. For example, the automatic contact sharing and connection application 308 may be a single unit of deployable executable code or a plurality of units of deployable executable code. According to one aspect, the automatic contact sharing and connection application 308 may include one component that may be a web application, a native application, and/or a mobile application (e.g., an app) downloaded from a digital distribution application platform that allows users to browse and download applications developed with mobile software development kits (SDKs) including the App Store and GOOGLE PLAY® among others.

The system 300 may also include a relational database management system (RDBMS) or another type of database management system such as a NoSQL database system that stores and communicates data from at least one database 310. The data stored in the at least one database may be associated with a list of contacts and associated data such as one or more images captured by the automatic contact sharing and connection application 308 and contact information associated with the one or more images as well as location information associated with the one or more images. As an example, the database may include one or more tables or data structures that may be organized to store the information associated with the database 310.

When a user first uses the automatic contact sharing and connection application 308, the user is asked to provide an email address and a password to register for use with the automatic contact sharing and connection system 300. The client computing device 302 may send a representation of the email address and the password to the server computing device and may create an associated account for the user. In addition, the user may be asked to provide their contact information including a photo, video, or selfie, a first name and a last name, a phone number, an email address, and additional information such as biographical information that may include one or more uniform resource locators (URLs). The information and/or a representation of the information may be stored in a database.

In one example, the automatic contact sharing and connection application 308 may send a notification that may be a reminder to a user a particular period of time after meeting another person and capturing at least one image of the person, e.g., five days after the meeting time. The notification may include contact information associated with the person such as the photo that was captured.

As another example, the automatic contact sharing and connection application 308 may allow a user to export contact information to a customer relationship management (CRM) system or application such as SALESFORCE CRM, among others.

As another example, as shown in FIG. 2B, the automatic contact sharing and connection application 308 may allow a user to select a particular location on the map 206 or select a particular period of time and filter contact information based on the filter. In other words, the contacts may be filtered based on location. In one example, the user can draw a circle or another shape 206 on the map by selecting a particular area on the touchscreen of the client computing device 302. This may select only contacts that were met in the circle or shape 206.

In another example, a user may view an augmented reality (AR) view of the map and one or more pins or user interface elements that may display in a three-dimensional view on a display of the client computing device. In one example, the AR view may show one or more photos at a particular location where the photos were captured on the map.

As another example, the automatic contact sharing and connection application 308 may utilize NFC communication such that each user may communicate their contact information with another. Alternatively, a user may have a particular two-dimensional code such as a QR code and they can provide their QR code to another user. When another user captures the QR code using their imaging device, contact information may be shared.

Figure 3B:
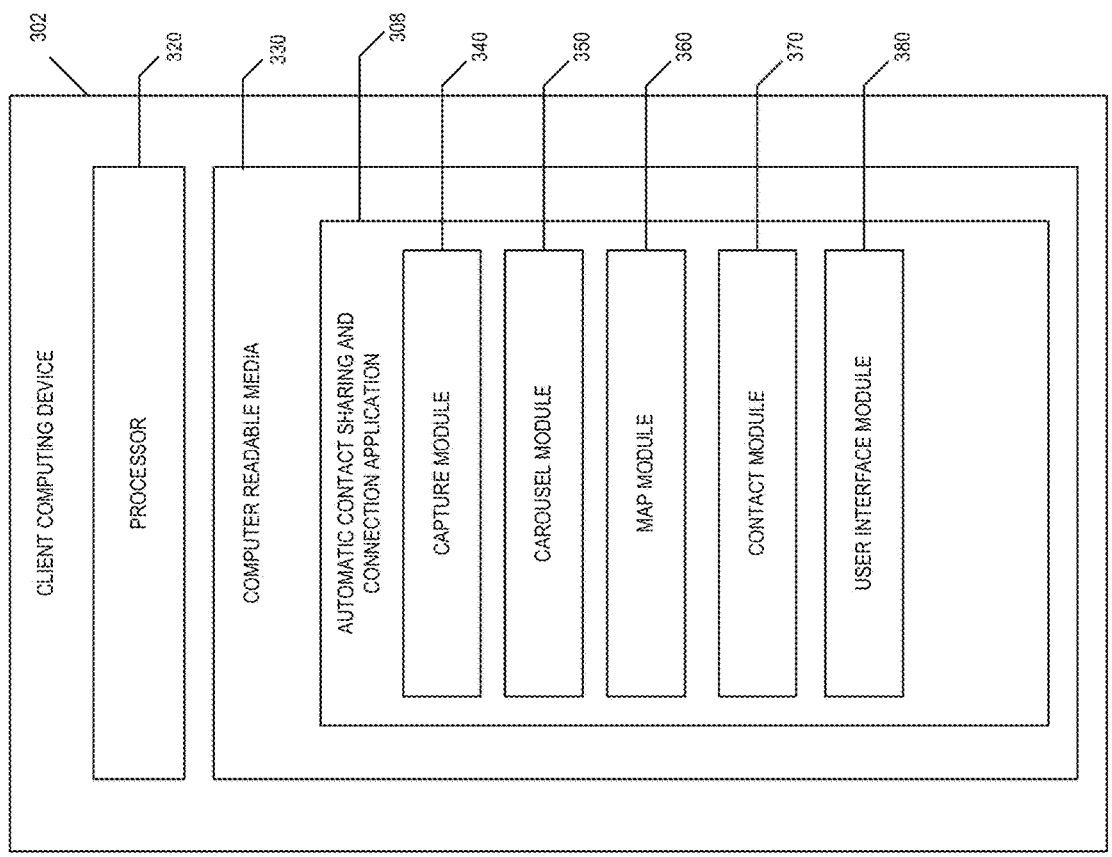
FIG. 3B shows a block diagram of a client computing device of the automatic contact sharing and connection system according to an example of the instant disclosure.

FIG. 3B illustrates a block diagram of the client computing device 302 according to an example of the instant disclosure. The client computing device 302 includes at least one processor 320 and computer readable media (CRM) 330 in memory on which the automatic contact sharing and connection application 308 or other user interface or application is stored. The computer readable media 330 may include volatile media, nonvolatile media, removable media, non-removable media, and/or another available medium that can be accessed by the processor. By way of example and not limitation, the computer readable media 330 comprises computer storage media and communication media. Computer storage media includes non-transitory storage memory, volatile media, nonvolatile media, removable media, and/or non-removable media implemented in a method or technology for storage of information, such as computer/machine-readable/executable instructions, data structures, program modules, or other data. Communication media may embody computer/machine-readable/executable instructions, data structures, program modules, or other data and include an information delivery media or system, both of which are hardware.

The automatic contact sharing and connection application 308 may include a capture module 340 that allows a user of the automatic contact sharing and connection application 308 to capture at least one image using front-facing imaging devices of the client computing device 302 and/or rear-facing imaging devices of the client computing device 302. The at least one image also may be captured with other imaging devices of the client computing device 302. In one example, the capture module 340 may receive a short press or touch of a button or user interface element and capture the at least one image. In another example, the capture module 340 may receive a long press or hold of the button or user interface element and capture a video. A short press may be a press having a duration of less than a particular period of time, e.g., less than one second, and a long press may be a press having a duration of at least the particular period of time, e.g., one second or more. When a long press it provided, the capture module 340 may capture up to ten seconds of video that may or may not include audio. The capture module 340 may count down from ten to zero as the video is being captured.

As an example, the capture module 340 may be used to insert or incorporate one or more filters with each of the at least one image. As an example, the filter may be placed on top of the at least one image and/or underneath the at least one image. The filter may be based on a particular location of the client computing device and/or a period of time. In one example, the filter may be a step and repeat banner that may visually appear to be behind one or more faces in the at least one image and may be associated with a particular event or meeting.

The automatic contact sharing and connection application 308 may include a carousel module 350 for displaying contact information for each contact. In one example, the carousel module 350 may provide a list or array of contact cards, each contact card having a name of a contact, an email address of a contact, a phone number of a contact, and other information associated with the contact. In addition, each contact card may have one or more images or videos associated with the contact and at least one particular location, e.g., GPS coordinates where the contact was met and the one or more images or videos were captured. As an example, the GPS coordinates may be associated with a hotel where a conference occurred such as the Cool Education Show, at the Super Cool Hotel, Las Vegas, Nevada. In another example, the GPS coordinates may be associated with a networking event held at Smith's Bar & Grill, New York, New York. In one example, the one or more images or videos may include one or more filters that may be based on the GPS coordinates and metadata such as a particular date and time, among other metadata from the one or more images or videos.

The automatic contact sharing and connection application 308 may include a map module 360 to obtain the location information associated with at least one image associated with each contact and generate an associated representation of a meeting place on a map.

As an example, the carousel module 350 and the map module 360 may together generate a first contact card from the list of contact cards, the first contact card comprising the name of the first contact, the phone number of the first contact, and the email address of the first contact displayed as the first layer that displays on top of the second layer comprising the at least one image and simultaneously display a first map GUI that shows a map of where the at least one image of the imaging device is captured.

Additionally, the carousel module 350 and the map module 360 may together receive a request to display a second contact card from the list of contact cards and transition from the first contact card to display a second contact card comprising a name of a second contact, a phone number of the second contact, and an email address of the second contact displayed as the first layer that displays on top of the second layer comprising at least one image of the second contact and simultaneously display a second map GUI that shows a map of where the at least one image of the second contact is captured.

In another example, as shown in FIG. 2B, the map module 360 may receive a request for a subset of contact information from the list of contact cards and display information associated with the subset of contact information. A user can select a particular section or area of a map by providing input such as by drawing a circle or another shape on the touchscreen of the client computing device 302. In another example, the user can input a particular area such as city name, an address, or a zip code and the map module 360 may provide contact information from the list of contact cards based on the input.

The automatic contact sharing and connection application 308 may include a contact module 370 to obtain additional information associated with each contact when the at least one image is captured such as a name of a contact, an email address associated with the contact, a phone number for the contact, and additional information for the contact. In addition, the contact module 370 is used to perform functions using the contact information for each contact. As an example, the contact module 370 can display a map of where a contact was met, can store contact information with contacts information in another application of the client computing device 302, e.g., a native phone or contact application, draft and send an email to the contact, draft and send a text message to the contact, and place a call to the phone number of the contact. In one example, the contact module 370 may generate an email template and a user can personalize the email content. In addition, the contact module 370 may generate a text message template and a user can personalize the content.

As an example, the text template or email template may include the following: "Emoji Wave Hey First Name Last Name, we met at Super Cool Location. Let's connect! Emoji Smile." In one example, the Super Cool Location may be determined using a mapping application programming interface (API). The contact information may be provided below as follows.

"Point Emoji Here's my contact info and contact card below:
Name: John Smith
Phone: 1-555-867-5309
Email: john (a) smith.com
Sent with Love Emoji from SelfTact.com
Selfie image"

In addition, the text template or email template may include the one or more images as well as a .vcard, .vcf, or Virtual Contact File that can be attached to the text message or the email.

In addition, the automatic contact sharing and connection application 308 includes a user interface module 380 for displaying the user interface on the display of the client computing device 302. As an example, the user interface module 380 generates a native and/or web-based graphical user interface (GUI) that accepts input and provides output viewed by a user of the client computing device 302. The client computing device 302 may provide realtime automatically and dynamically refreshed information such as an image that includes a capture from one or more imaging devices of the client computing device 302 and contact information, among other information. The user interface module 380 may send data to other modules of the automatic contact sharing and connection application 308 of the client computing device 302, and retrieve data from other modules of the automatic contact sharing and connection application 308 of the client computing device 302 asynchronously without interfering with the display and behavior of the user interface displayed by the client computing device 302.

Figure 4:
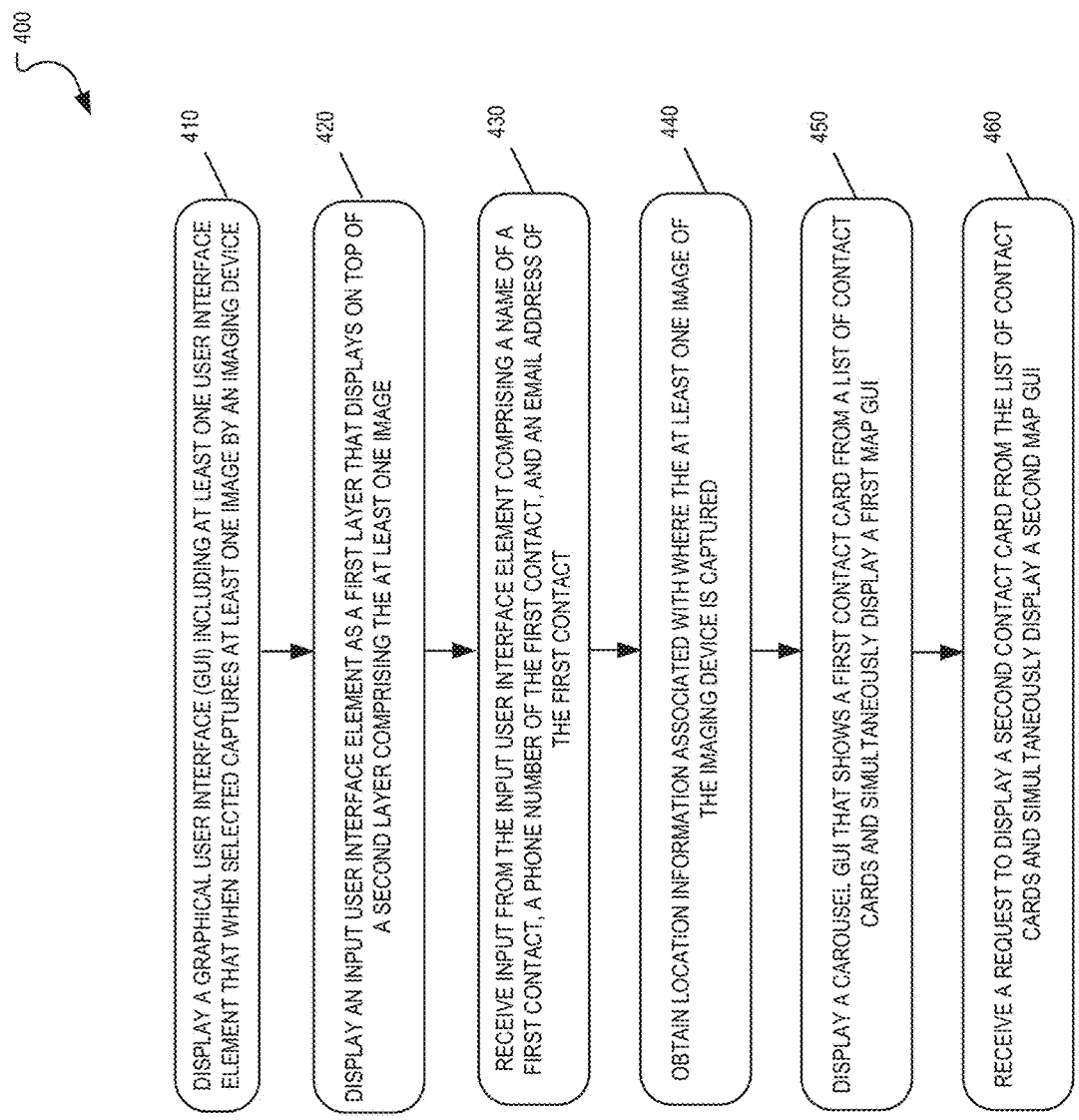
FIG. 4 illustrates an example method of capturing at least one image of one or more people at a particular event and receiving information associated with the one or more people according to an example of the instant disclosure.

FIG. 4 illustrates an example method of capturing at least one image of one or more people at a particular event and receiving information associated with the one or more people according to an example of the instant disclosure. Although the example method 400 depicts a particular sequence of operations, the sequence may be altered without departing from the scope of the present disclosure. For example, some of the operations depicted may be performed in parallel or in a different sequence that does not materially affect the function of the method 400. In other examples, different components of an example device or system that implements the method 400 may perform functions at substantially the same time or in a specific sequence.

According to some examples, the method 400 may include displaying a graphical user interface (GUI) including at least one user interface element that when selected captures at least one image by an imaging device at block 410.

Next, according to some examples, the method 400 may include displaying an input user interface element as a first layer that displays on top of a second layer comprising the at least one image at block 420.

Next, according to some examples, the method 400 may include receiving input from the input user interface element comprising a name of a first contact, a phone number of the first contact, and an email address of the first contact at block 430.

Next, according to some examples, the method 400 may include obtaining location information associated with where the at least one image of the imaging device is captured at block 440. In one example, the location information may be determined by the client computing device 302 using at least one of GPS hardware information, Wi-Fi network information, cellular network information including cellular tower locations, and Bluetooth hardware information.

Next, according to some examples, the method 400 may include displaying a carousel GUI that shows a first contact card from a list of contact cards, the first contact card including the name of the first contact, the phone number of the first contact, and the email address of the first contact displayed as the first layer that displays on top of the second layer including the at least one image and simultaneously displaying a first map GUI that shows a map of where the at least one image of the imaging device is captured at block 450.

Next, according to some examples, the method 400 may include receiving a request to display a second contact card from the list of contact cards and transitioning the carousel GUI from the first contact card to displaying a second contact card comprising a name of a second contact, a phone number of the second contact, and an email address of the second contact displayed as the first layer that displays on top of the second layer including at least one image of the second contact and simultaneously displaying a second map GUI that shows a map of where the at least one image of the second contact is captured at block 460. As an example, a user may swipe the first contact card to the left or to the right and a different contact card and an associated map may rotate into a center of the GUI.

According to some examples, the method 400 may include capturing the at least one image by the imaging device when the at least one user interface element is touched on a touchscreen of a computing device less than a particular period of time such as the client computing device 302.

According to some examples, the method 400 may include capturing a video by the imaging device when the at least one user interface element is held for a particular period of time on a touchscreen of a computing device such as the client computing device 302.

According to some examples, the method 400 may include receiving a gesture in a downward direction on a touchscreen of a computing device to select one of at least one front-facing imaging device of a computing device such as the client computing device 302 and at least one rear-facing imaging device of the computing device to capture the at least one image.

According to some examples, the method 400 may include receiving a selection of a contacts user interface element and displaying a GUI having a searchable list of contacts.

According to some examples, the method 400 may include receiving a selection of a map navigation user interface element and displaying a map having a pin representing at least one image associated with each contact from the list of contact cards. A user may select a subset of the map by providing a gesture on the touchscreen of the client computing device 302 such as drawing a particular area on the map, e.g., a circle or a polygon. This may select a subset of the list of contact cards that have images from the particular area on the map.

According to some examples, the method 400 may include receiving a selection of the pin and displaying information associated with an associated contact overlaid on the map comprising a name of the associated contact, a phone number of the associated contact, and an email address of the associated contact.

According to some examples, the method 400 may include receiving a gesture in a left direction on a touchscreen of a computing device such as the client computing device 302 to display a login GUI having an email address entry user interface element, a password user interface element, and a login button user interface element.

According to some examples, the method 400 may include receiving a gesture in a right direction on a touchscreen of a computing device such as the client computing device 302 to display a GUI having a searchable list of contacts.

According to some examples, the method 400 may include displaying the input user interface element as the first layer that displays on top of the second layer including the at least one image and displaying a third layer that displays as a filter incorporated with the at least one image. As an example, the filter may be at least partially translucent and displayed on the at least one image. As another example, the filter can be displayed behind the at least one image. As an example, the filter can be determined based on a particular location where the at least one image of the imaging device is captured. As an example, the filter can be a step and repeat banner associated with a particular location where the at least one image of the imaging device is captured.

As another example, the filter can be associated with a particular event and associated with a particular period of time when the at least one image of the imaging device is captured.

According to some examples, the method 400 may include receiving initial contact information including at least one image of a user, a first name of the user, a last name of the user, a phone number of the user, an email address of the user, and additional information for the user. As an example, the additional information may include biographical information for the user. The biographical user information may include at least one uniform resource locator (URL).

According to some examples, the method 400 may include sending a notification to remind a user to make a connection with another person, the notification sent a particular period of time from when the at least one image is captured such as five days or another particular period of time such as three days. In one example, the notification may be at least one of a push notification, a text message, an email message, or another type of notification.

According to some examples, the method 400 may include receiving a selection of a particular section of the map based on input received by a touchscreen including a shape provided to the touchscreen of a client computing device, determining a subset of the list of contact cards based on the input, and displaying information associated with the subset of the list of contact cards.

Figure 5:
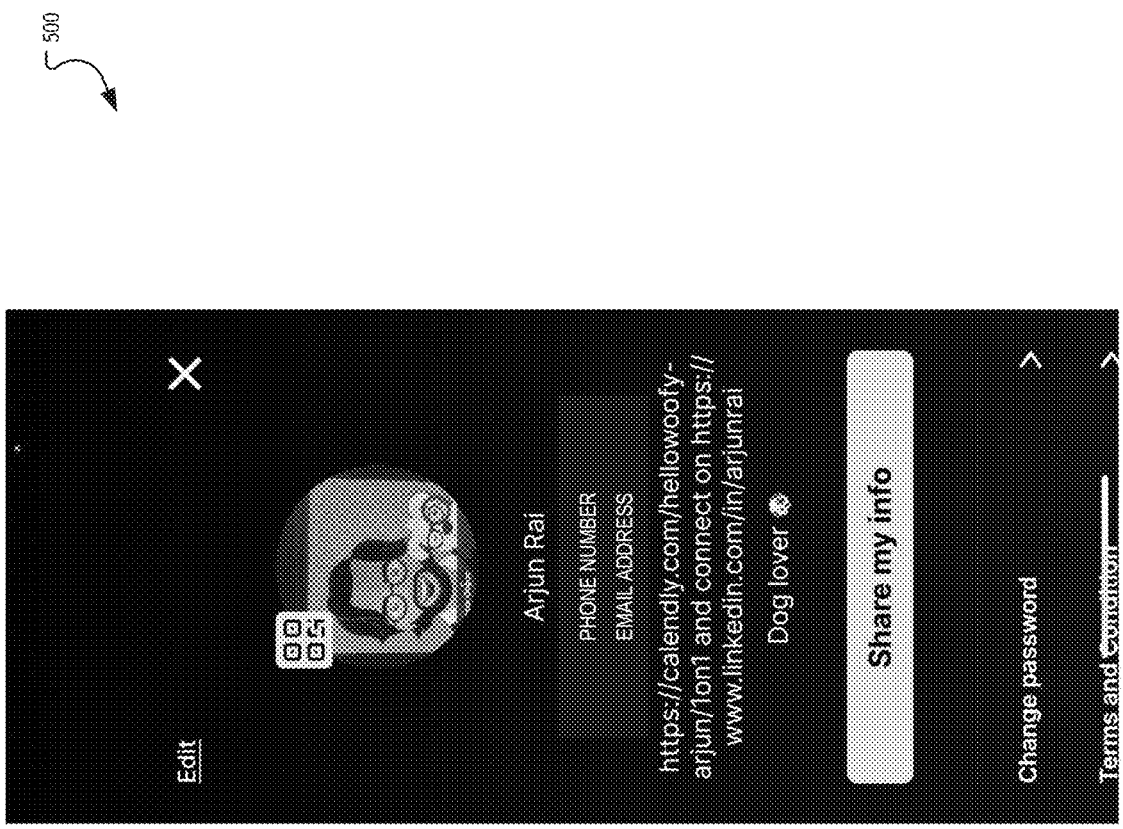
FIG. 5 illustrates a screenshot of an example user interface of the automatic contact sharing and connection application displayed by a client computing device according to an example of the instant disclosure.

FIG. 5 shows a screenshot of an example user interface 500 of the automatic contact sharing and connection application 308 displayed by the client computing device 302 according to an example of the instant disclosure. As shown in FIG. 5, a user of the automatic contact sharing and connection application 308 may have an information and settings GUI that allows a user to provide their information including a first name and a last name, a phone number, an email address, and other information that may include a short biography as well as one or more uniform resource locators (URLs). As shown in FIG. 5, there is a first URL that may be a link to a first URL such as calendly.com and a second link to a LINKEDIN profile. In addition, the short biography indicates "Dog lover Dog Emoji." In addition, each user of the automatic contact sharing and connection application 308 may have a two-dimensional code such as a QR code. Another user of the automatic contact sharing and connection application 308 can capture an image of the two-dimensional code to obtain information associated with the user.

Figure 6:
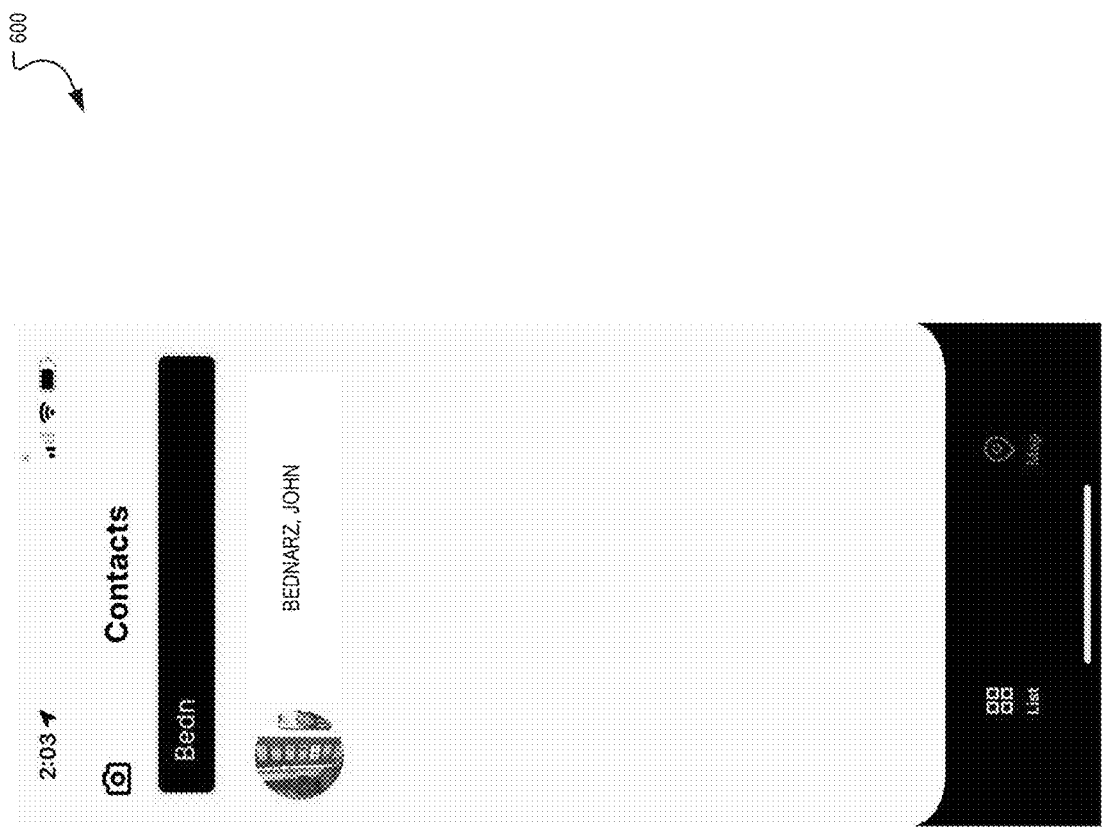
FIG. 6 illustrates a screenshot of an example user interface of the automatic contact sharing and connection application displayed by the client computing device according to an example of the instant disclosure.

FIG. 6 shows a screenshot of an example user interface 600 of the automatic contact sharing and connection application 308 displayed by the client computing device 302 according to an example of the instant disclosure. As shown in FIG. 6, a user may have a list of contacts associated with the automatic contact sharing and connection application. The user can search through the list of contacts using a search graphical user interface element and providing at least one character. In addition, each contact in the list of contacts may have a small or thumbnail image of the contact as well as a name, a phone number, and an email address. When a user selects a particular contact an associated contact card may be displayed. In addition, a user can edit each of the list of contacts by selecting the particular contact and also can delete a particular contact from the list of contacts by swiping left or right on the touchscreen and selecting a delete user interface element or selecting a delete user interface element that may be displayed on the contact card of the contact.

Figure 7:
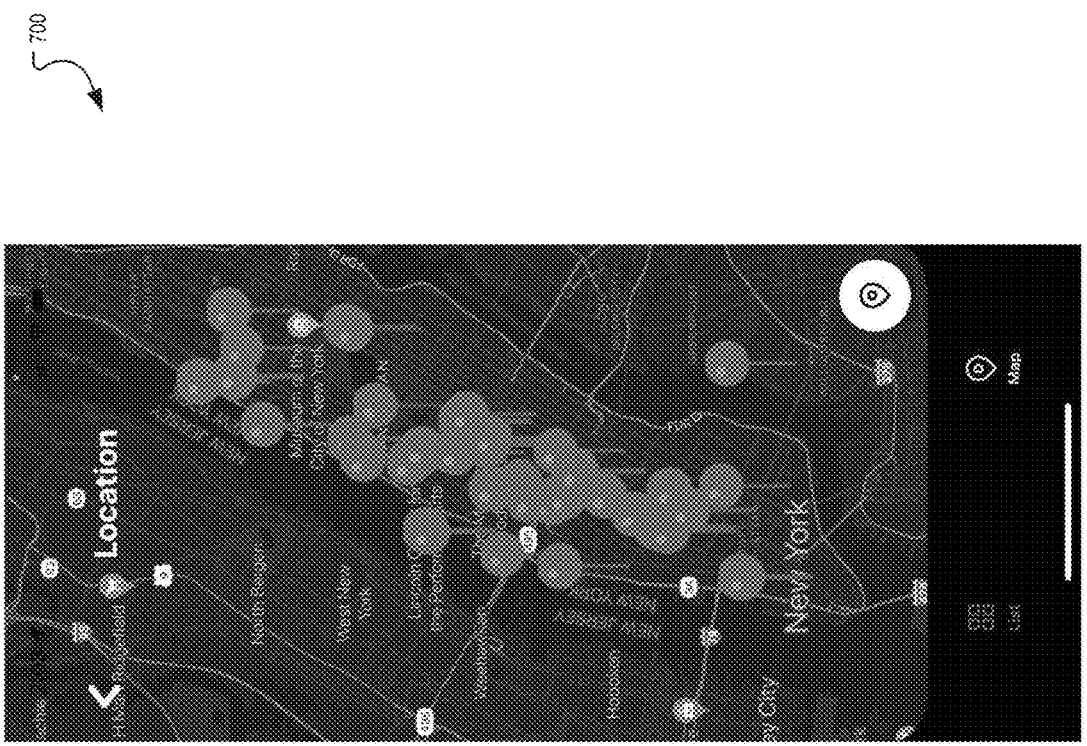
FIG. 7 illustrates a screenshot of an example user interface of the automatic contact sharing and connection application displayed by the client computing device according to an example of the instant disclosure.

FIG. 7 shows a screenshot of an example user interface 700 of the automatic contact sharing and connection application 308 displayed by the client computing device 302 according to an example of the instant disclosure. As shown in FIG. 7, a user may display their list of contacts on a map view. Each pin that is shown on the map may be associated with a location of where the contact was met and one or more images were captured by the client computing device 302.

Figure 8:
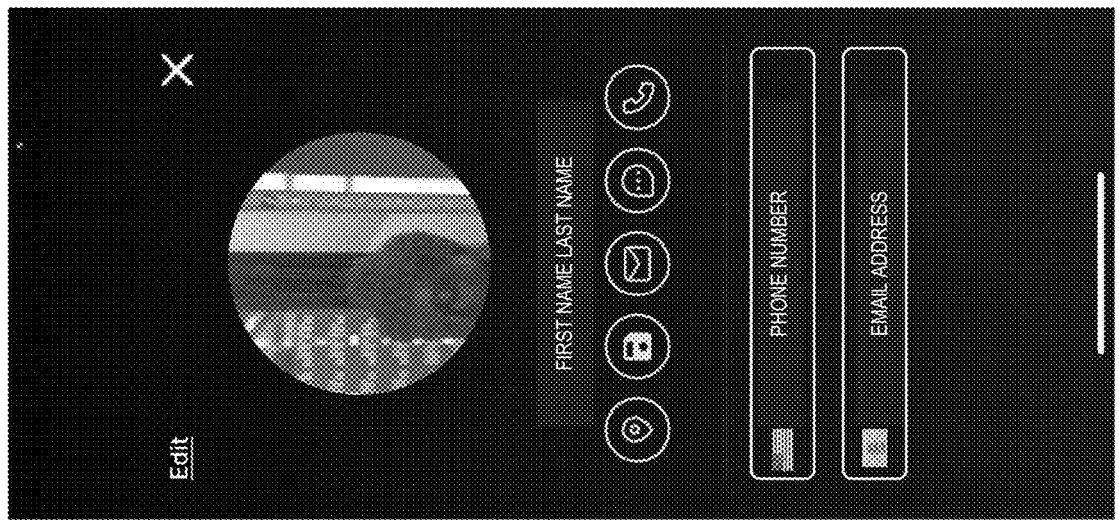
FIG. 8 illustrates a screenshot of an example user interface of the automatic contact sharing and connection application displayed by the client computing device according to an example of the instant disclosure.

FIG. 8 shows a screenshot of an example user interface 800 of the automatic contact sharing and connection application 308 displayed by the client computing device 302 according to an example of the instant disclosure. As shown in FIG. 8, each contact may have information including one or more images or one or more videos, a first name, a last name, a phone number and an associated country based on the phone number, and an email address. The automatic contact sharing and connection application 308 may determine a particular country based on the phone number and display a particular name of the country and/or a flag of the country. This may be based on a country code associated with the phone number. A user can select one of a number of user interface elements to perform functions using the contact information. As an example, the user can select a map pin user interface element to display a map of where a contact was met, a save user interface element to store contact information with contacts information in another application of the client computing device, a mail user interface element to begin drafting an email to the contact, a text user interface element to begin drafting a text message to the contact, and a phone user interface element to place a call to the phone number of the contact.

Figure 9:
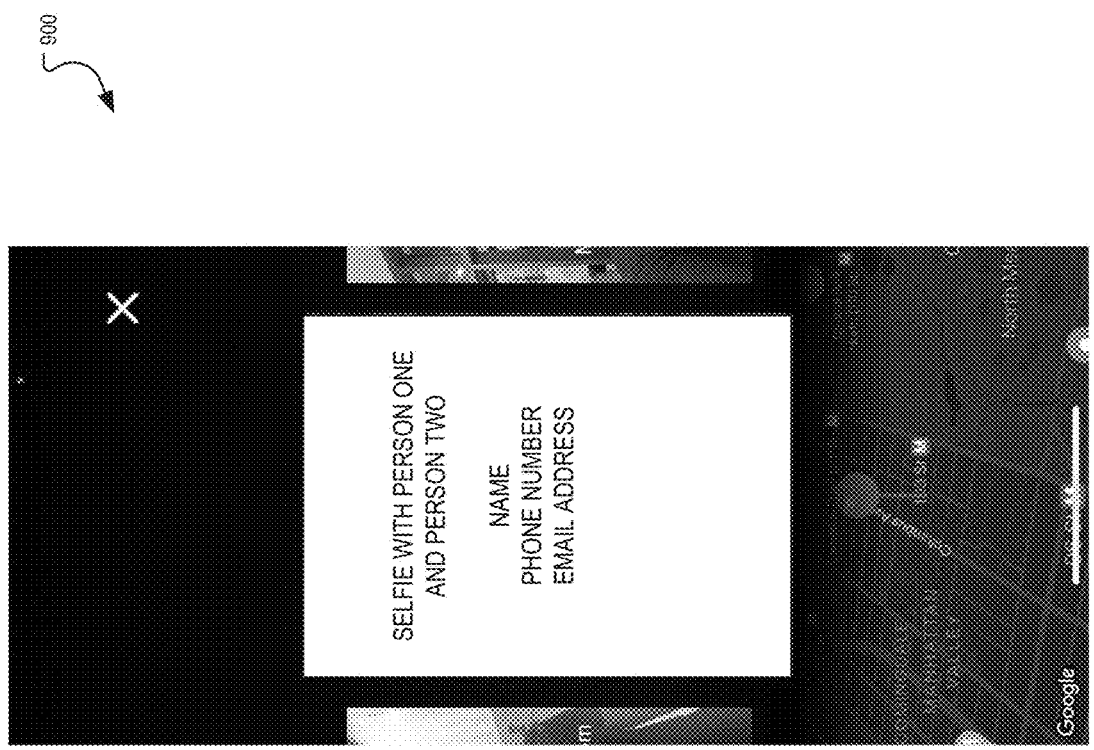
FIG. 9 illustrates a screenshot of an example user interface of the automatic contact sharing and connection application displayed by the client computing device according to an example of the instant disclosure.

FIG. 9 shows a screenshot of an example user interface 900 of the automatic contact sharing and connection application 308 displayed by the client computing device 302 according to an example of the instant disclosure. As shown in FIG. 9, a user may view a carousel of each contact including one or more images that may include a selfie of a first person (e.g., the user of the automatic contact sharing and connection application 308) and a second person as well as a name of the second person, a phone number of the second person, and an email address of the second person. Additionally, the automatic contact sharing and connection application 308 may display a map where the one or more images were captured as well as a pin that indicates where the one or more images were captured. The user may swipe left and right through the carousel to display different images of different people that have been met. When a different image is displayed, a corresponding map with a pin that indicates where the one or more images were captured is displayed.

Figure 10:
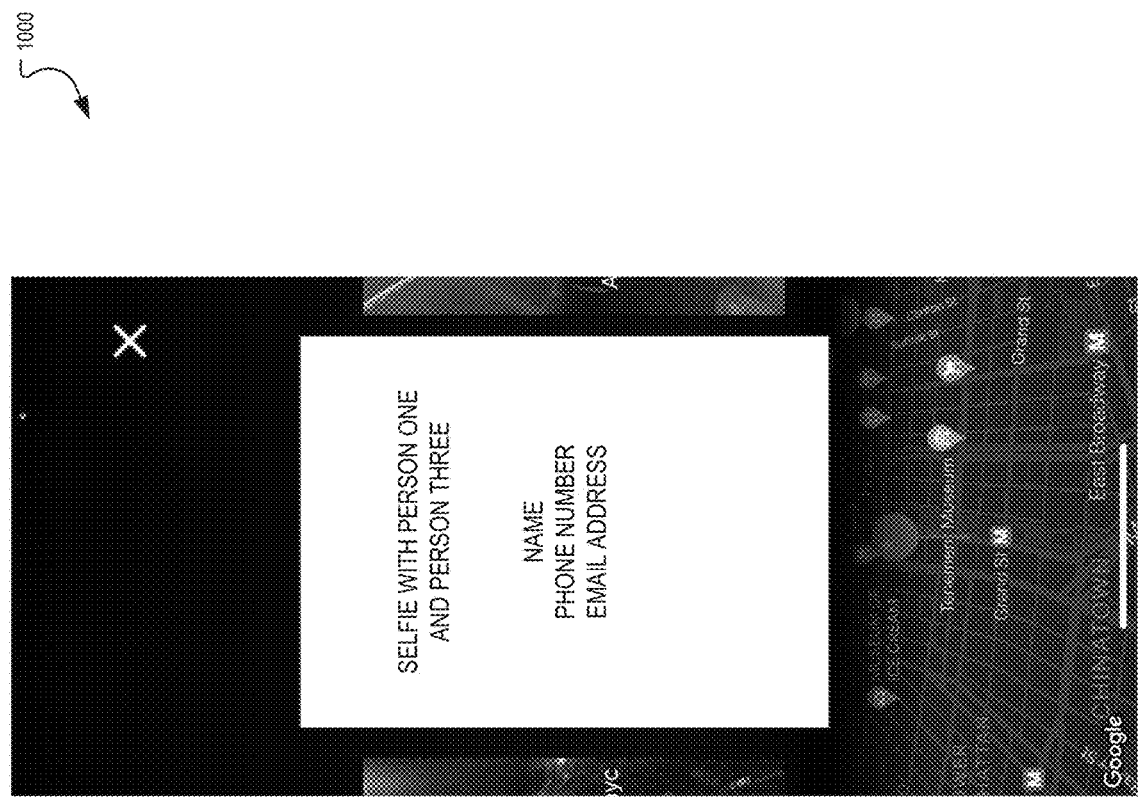
FIG. 10 illustrates a screenshot of an example user interface of the automatic contact sharing and connection application displayed by the client computing device according to an example of the instant disclosure.

FIG. 10 shows a screenshot of an example user interface 1000 of the automatic contact sharing and connection application 108 displayed by the client computing device 302 according to an example of the instant disclosure. As shown in FIG. 10, a user may view a carousel of each contact including one or more images that may include a selfie of a first person (e.g., the user of the automatic contact sharing and connection application 308) and a third person as well as a name of the third person, a phone number of the third person, and an email address of the third person. Additionally, the automatic contact sharing and connection application 308 may display a map where the one or more images were captured as well as a pin that indicates where the one or more images were captured. The user may swipe left and right through the carousel to display different images of different people that have been met. When a different image is displayed, a corresponding map with a pin that indicates where the one or more images were captured is displayed.

Figure 11:
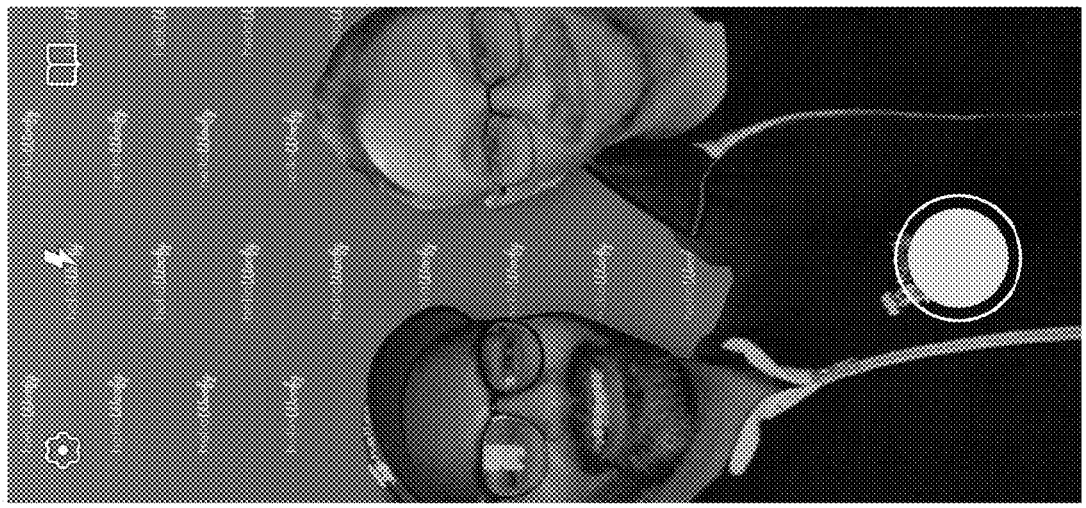
FIG. 11 illustrates a screenshot of an example user interface of the automatic contact sharing and connection application displayed by the client computing device according to an example of the instant disclosure.

FIG. 11 shows a screenshot of an example user interface 1100 of the automatic contact sharing and connection application 308 displayed by the client computing device 302 according to an example of the instant disclosure. As shown in FIG. 11, there may be an image of a first person and a second person in addition to a filter that can be displayed behind the first person and the second person. In this case, the filter is associated with a particular location and/or a particular period of time.

Figure 12:
FIG. 12 illustrates a screenshot of an example user interface of the automatic contact sharing and connection application displayed by the client computing device according to an example of the instant disclosure.

FIG. 12 shows a screenshot of an example user interface 1200 of the automatic contact sharing and connection application 308 displayed by the client computing device 302 according to an example of the instant disclosure. As shown in FIG. 12, there may be an image of a first person and a second person in addition to a filter that can be displayed behind the first person and the second person. In this case, the filter is associated with a particular location and/or a particular period of time.

Figure 13:
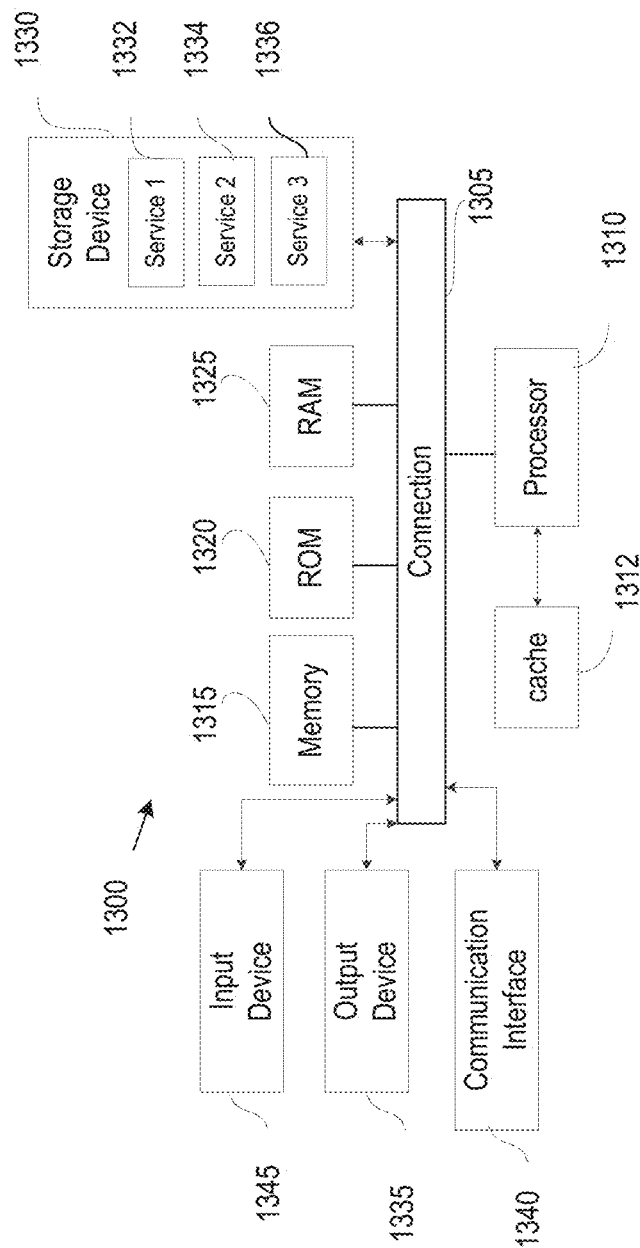
FIG. 13 shows an example of a system for implementing certain aspects of the present technology according to an example of the instant disclosure.

FIG. 13 shows an example of computing system 1300, which can be for example any computing device making up the computing device such as the client computing device 302, the server computing device 304, or any component thereof in which the components of the system are in communication with each other using connection 1305. Connection 1305 can be a physical connection via a bus, or a direct connection into processor 1310, such as in a chipset architecture. Connection 1305 can also be a virtual connection, networked connection, or logical connection.

In some embodiments, computing system 1300 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1300 includes at least one processing unit (CPU or processor) 1310 and connection 1305 that couples various system components including system memory 1315, such as read-only memory (ROM) 1320 and random access memory (RAM) 1325 to processor 1310. Computing system 1300 can include a cache of high-speed memory 1312 connected directly with, in close proximity to, or integrated as part of processor 1310.

Processor 1310 can include any general purpose processor and a hardware service or software service, such as services 1332, 1334, and 1336 stored in storage device 1330, configured to control processor 1310 as well as a special-purpose processor where software instructions are incorporated into the actual processor design. Processor 1310 may essentially be a completely self-contained computing system, containing multiple cores or processors, a bus, memory controller, cache, etc. A multi-core processor may be symmetric or asymmetric.

To enable user interaction, computing system 1300 includes an input device 1345, which can represent any number of input mechanisms, such as a microphone for speech, a touch-sensitive screen for gesture or graphical input, keyboard, mouse, motion input, speech, etc. Computing system 1300 can also include output device 1335, which can be one or more of a number of output mechanisms known to those of skill in the art. In some instances, multimodal systems can enable a user to provide multiple types of input/output to communicate with computing system 1300. Computing system 1300 can include communications interface 1340, which can generally govern and manage the user input and system output. There is no restriction on operating on any particular hardware arrangement, and therefore the basic features here may easily be substituted for improved hardware or firmware arrangements as they are developed.

Storage device 1330 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 1330 can include software services, servers, services, etc., that when the code that defines such software is executed by the processor 1310, it causes the system to perform a function. In some embodiments, a hardware service that performs a particular function can include the software component stored in a computer-readable medium in connection with the necessary hardware components, such as processor 1310, connection 1305, output device 1335, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Illustrative Examples of the Disclosure Include

Aspect 1: A system comprising: a memory storing computer-readable instructions; and at least one processor to execute the instructions to display a graphical user interface (GUI) comprising at least one user interface element that when selected captures at least one image by an imaging device, display an input user interface element as a first layer that displays on top of a second layer comprising the at least one image, receive input from the input user interface element comprising a name of a first contact, a phone number of the first contact, and an email address of the first contact, obtain location information associated with where the at least one image of the imaging device is captured, display a carousel GUI that shows a first contact card from a list of contact cards, the first contact card comprising the name of the first contact, the phone number of the first contact, and the email address of the first contact displayed as the first layer that displays on top of the second layer comprising the at least one image and simultaneously display a first map GUI that shows a map of where the at least one image of the imaging device is captured, and receive a request to display a second contact card from the list of contact cards and transition the carousel GUI from the first contact card to display a second contact card comprising a name of a second contact, a phone number of the second contact, and an email address of the second contact displayed as the first layer that displays on top of the second layer comprising at least one image of the second contact and simultaneously display a second map GUI that shows a map of where the at least one image of the second contact is captured.

Aspect 2: The system of Aspect 1, the at least one processor further to capture the at least one image by the imaging device when the at least one user interface element is touched on a touchscreen of a computing device less than a particular period of time.

Aspect 3: The system of Aspects 1 and 2, the at least one processor further to capture a video by the imaging device when the at least one user interface element is held for a particular period of time on a touchscreen of a computing device.

Aspect 4: The system of Aspects 1 to 3, the at least one processor further to receive a gesture in a downward direction on a touchscreen of a computing device to select one of at least one front-facing imaging device of a computing device and at least one rear-facing imaging device of the computing device to capture the at least one image.

Aspect 5: The system of Aspects 1 to 4, the at least one processor further to receive a selection of a contacts user interface element and display a GUI having a searchable list of contacts.

Aspect 6: The system of Aspects 1 to 5, the at least one processor further to receive a selection of a map navigation user interface element and display a map having a pin representing at least one image associated with each contact from the list of contact cards.

Aspect 7: The system of Aspects 1 to 6, the at least one processor further to receive a selection of the pin and display information associated with an associated contact overlaid on the map comprising a name of the associated contact, a phone number of the associated contact, and an email address of the associated contact.

Aspect 8: The system of Aspects 1 to 7, the at least one processor further to receive a gesture in a left direction on a touchscreen of a computing device to display a login GUI having an email address entry user interface element, a password user interface element, and a login button user interface element.

Aspect 9: The system of Aspects 1 to 8, the at least one processor further to receive a gesture in a right direction on a touchscreen of a computing device to display a GUI having a searchable list of contacts.

Aspect 10: The system of Aspects 1 to 9, the at least one processor further to display the input user interface element as the first layer that displays on top of the second layer comprising the at least one image and display a third layer that displays as a filter incorporated with the at least one image.

Aspect 11: The system of Aspects 1 to 10, wherein the filter is at least partially translucent and displayed on the at least one image.

Aspect 12: The system of Aspects 1 to 11, wherein the filter is displayed behind the at least one image.

Aspect 13: The system of Aspects 1 to 12, wherein the filter is determined based on a particular location where the at least one image of the imaging device is captured.

Aspect 14: The system of Aspects 1 to 13, wherein the filter comprises a step and repeat banner associated with a particular location where the at least one image of the imaging device is captured.

Aspect 15: The system of Aspects 1 to 14, wherein the filter is associated with a particular event and associated with a particular period of time when the at least one image of the imaging device is captured.

Aspect 16: The system of Aspects 1 to 15, the at least one processor further to receive initial contact information comprising at least one image of a user, a first name of the user, a last name of the user, a phone number of the user, an email address of the user, and additional information for the user.

Aspect 17: The system of Aspects 1 to 16, wherein the additional information comprises biographical information for the user.

Aspect 18: The system of Aspects 1 to 17, wherein the biographical information comprises at least one uniform resource locator (URL).

Aspect 19: The system of Aspects 1 to 18, the at least one processor further to send a notification to remind a user to make a connection with another person, the notification sent a particular period of time from when the at least one image is captured.

Aspect 20: The system of Aspects 1 to 19, the at least one processor further to receive a selection of a particular section of the map based on input received by a touchscreen comprising a shape provided to the touchscreen of a client computing device, determine a subset of the list of contact cards based on the input, and display information associated with the subset of the list of contact cards.

Aspect 21: A method including displaying, by at least one processor, a graphical user interface (GUI) comprising at least one user interface element that when selected captures at least one image by an imaging device, displaying, by the at least one processor, an input user interface element as a first layer that displays on top of a second layer comprising the at least one image, receiving, by the at least one processor, input from the input user interface element comprising a name of a first contact, a phone number of the first contact, and an email address of the first contact, obtaining, by the at least one processor, location information associated with where the at least one image of the imaging device is captured, displaying, by the at least one processor, a carousel GUI that shows a first contact card from a list of contact cards, the first contact card comprising the name of the first contact, the phone number of the first contact, and the email address of the first contact displayed as the first layer that displays on top of the second layer comprising the at least one image and simultaneously displaying a first map GUI that shows a map of where the at least one image of the imaging device is captured, and receiving, by the at least one processor, a request to display a second contact card from the list of contact cards and transitioning the carousel GUI from the first contact card to displaying a second contact card comprising a name of a second contact, a phone number of the second contact, and an email address of the second contact displayed as the first layer that displays on top of the second layer comprising at least one image of the second contact and simultaneously display a second map GUI that shows a map of where the at least one image of the second contact is captured.

Aspect 22: A non-transitory computer-readable storage medium comprising instructions stored thereon that, when executed by a computing device cause the computing device to perform operations, the operations including displaying a graphical user interface (GUI) comprising at least one user interface element that when selected captures at least one image by an imaging device, displaying an input user interface element as a first layer that displays on top of a second layer comprising the at least one image, receiving input from the input user interface element comprising a name of a first contact, a phone number of the first contact, and an email address of the first contact, obtaining location information associated with where the at least one image of the imaging device is captured, displaying a carousel GUI that shows a first contact card from a list of contact cards, the first contact card comprising the name of the first contact, the phone number of the first contact, and the email address of the first contact displayed as the first layer that displays on top of the second layer comprising the at least one image and simultaneously displaying a first map GUI that shows a map of where the at least one image of the imaging device is captured, and receiving a request to display a second contact card from the list of contact cards and transitioning the carousel GUI from the first contact card to displaying a second contact card comprising a name of a second contact, a phone number of the second contact, and an email address of the second contact displayed as the first layer that displays on top of the second layer comprising at least one image of the second contact and simultaneously display a second map GUI that shows a map of where the at least one image of the second contact is captured.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A system comprising:
   a memory storing computer-readable instructions; and at least one processor to execute the instructions to:
  display a graphical user interface (GUI) comprising at least one user interface element that when selected captures at least one image by an imaging device;
  display an input user interface element as a first layer that displays on top of a second layer comprising the at least one image;
  receive input from the input user interface element comprising a name of a first contact, a phone number of the first contact, and an email address of the first contact;
  obtain location information associated with where the at least one image of the imaging device is captured;
  display a carousel GUI that shows a first contact card from a list of contact cards, the first contact card comprising the name of the first contact, the phone number of the first contact, and the email address of the first contact displayed as the first layer that displays on top of the second layer comprising the at least one image and simultaneously display a first map GUI that shows a map of where the at least one image of the imaging device is captured; and
  receive a request to display a second contact card from the list of contact cards and transition the carousel GUI from the first contact card to display a second contact card comprising a name of a second contact, a phone number of the second contact, and an email address of the second contact displayed as the first layer that displays on top of the second layer comprising at least one image of the second contact and simultaneously display a second map GUI that shows a map of where the at least one image of the second contact is captured.

2. The system of claim 1, the at least one processor further to capture the at least one image by the imaging device when the at least one user interface element is touched on a touchscreen of a computing device less than a particular period of time.

3. The system of claim 1, the at least one processor further to capture a video by the imaging device when the at least one user interface element is held for a particular period of time on a touchscreen of a computing device.

4. The system of claim 1, the at least one processor further to receive a gesture in a downward direction on a touchscreen of a computing device to select one of at least one front-facing imaging device of a computing device and at least one rear-facing imaging device of the computing device to capture the at least one image.

5. The system of claim 1, the at least one processor further to receive a selection of a contacts user interface element and display a GUI having a searchable list of contacts.

6. The system of claim 5, the at least one processor further to receive a selection of a map navigation user interface element and display a map having a pin representing at least one image associated with each contact from the list of contact cards.

7. The system of claim 6, the at least one processor further receive a selection of the pin and display information associated with an associated contact overlaid on the map comprising a name of the associated contact, a phone number of the associated contact, and an email address of the associated contact.

8. The system of claim 1, the at least one processor further to receive a gesture in a left direction on a touchscreen of a computing device to display a login GUI having an email address entry user interface element, a password user interface element, and a login button user interface element.

9. The system of claim 1, the at least one processor further to receive a gesture in a right direction on a touchscreen of a computing device to display a GUI having a searchable list of contacts.

10. The system of claim 1, the at least one processor further to display the input user interface element as the first layer that displays on top of the second layer comprising the at least one image and display a third layer that displays as a filter incorporated with the at least one image.

11. The system of claim 10, wherein the filter is at least partially translucent and displayed on the at least one image.

12. The system of claim 10, wherein the filter is displayed behind the at least one image.

13. The system of claim 10, wherein the filter is determined based on a particular location where the at least one image of the imaging device is captured.

14. The system of claim 10, wherein the filter comprises a step and repeat banner associated with a particular location where the at least one image of the imaging device is captured.

15. The system of claim 10, wherein the filter is associated with a particular event and associated with a particular period of time when the at least one image of the imaging device is captured.

16. The system of claim 1, the at least one processor further to receive initial contact information comprising at least one image of a user, a first name of the user, a last name of the user, a phone number of the user, an email address of the user, and additional information for the user.

17. The system of claim 16, wherein the additional information comprises biographical information for the user.

18. The system of claim 17, wherein the biographical information comprises at least one uniform resource locator (URL).

19. The system of claim 1, the at least one processor further to send a notification to remind a user to make a connection with another person, the notification sent a particular period of time from when the at least one image is captured.

20. The system of claim 1, the at least one processor further to receive a selection of a particular section of the map based on input received by a touchscreen comprising a shape provided to the touchscreen of a client computing device, determine a subset of the list of contact cards based on the input, and display information associated with the subset of the list of contact cards.

21. A method, comprising:
  displaying, by at least one processor, a graphical user interface (GUI) comprising at least one user interface element that when selected captures at least one image by an imaging device;
  displaying, by the at least one processor, an input user interface element as a first layer that displays on top of a second layer comprising the at least one image;
  receiving, by the at least one processor, input from the input user interface element comprising a name of a first contact, a phone number of the first contact, and an email address of the first contact;
  obtaining, by the at least one processor, location information associated with where the at least one image of the imaging device is captured;
  displaying, by the at least one processor, a carousel GUI that shows a first contact card from a list of contact cards, the first contact card comprising the name of the first contact, the phone number of the first contact, and the email address of the first contact displayed as the first layer that displays on top of the second layer comprising the at least one image and simultaneously displaying a first map GUI that shows a map of where the at least one image of the imaging device is captured; and receiving, by the at least one processor, a request to display a second contact card from the list of contact cards and transitioning the carousel GUI from the first contact card to displaying a second contact card comprising a name of a second contact, a phone number of the second contact, and an email address of the second contact displayed as the first layer that displays on top of the second layer comprising at least one image of the second contact and simultaneously display a second map GUI that shows a map of where the at least one image of the second contact is captured.

22. A non-transitory computer-readable storage medium comprising instructions stored thereon that, when executed by a computing device cause the computing device to perform operations, the operations comprising:

displaying a graphical user interface (GUI) comprising at least one user interface element that when selected captures at least one image by an imaging device;

displaying an input user interface element as a first layer that displays on top of a second layer comprising the at least one image;

receiving input from the input user interface element comprising a name of a first contact, a phone number of the first contact, and an email address of the first contact;

obtaining location information associated with where the at least one image of the imaging device is captured;

displaying a carousel GUI that shows a first contact card from a list of contact cards, the first contact card comprising the name of the first contact, the phone number of the first contact, and the email address of the first contact displayed as the first layer that displays on top of the second layer comprising the at least one image and simultaneously displaying a first map GUI that shows a map of where the at least one image of the imaging device is captured; and receiving a request to display a second contact card from the list of contact cards and transitioning the carousel GUI from the first contact card to displaying a second contact card comprising a name of a second contact, a phone number of the second contact, and an email address of the second contact displayed as the first layer that displays on top of the second layer comprising at least one image of the second contact and simultaneously display a second map GUI that shows a map of where the at least one image of the second contact is captured.

* * * * *